United States Patent [19]

Wieschel

[11] Patent Number: 4,529,066

[45] Date of Patent: Jul. 16, 1985

[54] SAFETY BRAKE FOR MAST-TYPE CRANE

[75] Inventor: John E. Wieschel, Hartland, Wis.

[73] Assignee: Harnischfeger Corporation, Milwaukee, Wis.

[21] Appl. No.: 372,613

[22] Filed: Apr. 28, 1982

[51] Int. Cl.[3] ........................ B65B 5/16; B66C 19/00; B65G 65/00

[52] U.S. Cl. ........................................ 187/86; 212/124; 414/266; 414/279

[58] Field of Search ................................ 414/266-267, 414/277, 279; 212/124; 187/73, 76-77, 80-88

[56] References Cited

U.S. PATENT DOCUMENTS

| | | | |
|---|---|---|---|
| 1,206,350 | 11/1916 | Meech | 187/80 |
| 2,561,060 | 7/1951 | Lancaster | 187/87 |
| 3,517,775 | 6/1970 | Meyer | 187/87 |
| 3,543,884 | 12/1970 | Riedner | 187/87 |
| 3,606,039 | 9/1971 | Weston et al. | 414/277 |
| 3,887,038 | 6/1975 | Buschbom et al. | 187/87 |

FOREIGN PATENT DOCUMENTS

| | | | |
|---|---|---|---|
| 14738 | of 1893 | United Kingdom | 187/80 |
| 28157 | of 1909 | United Kingdom | 187/80 |

*Primary Examiner*—Galen L. Barefoot
*Assistant Examiner*—R. B. Johnson
*Attorney, Agent, or Firm*—James E. Nilles

[57] ABSTRACT

In a mast crane wherein a tension member controls the position of a carriage along an upright guide rail, the tension member is connected with a load transmitting element against which an abutment on the carriage bears down under carriage weight. A brake shoe carrier that has a link connection with the carriage carries two brake shoes, and by swinging about said link connection it clampwise engages them against opposite carriage-guiding surfaces on the rail. A linkage connecting the load transmitting element with the brake shoe carrier causes brake-engaging swinging of the carrier when the load transmitting element drops away from the abutment upon failure of the tension member. A spring biases the brake shoe carrier for such swinging, but its force is normally overcome by weight of the carriage. The link connection of the brake shoe carrier with the carriage is arranged for brake self-energizing once the brake shoes engage the rail.

1 Claim, 9 Drawing Figures

SAFETY BRAKE FOR MAST-TYPE CRANE

FIELD OF THE INVENTION

This invention relates generally to mast-type cranes, that is, to cranes of the type having a vertical mast along which a carriage or the like is guided for up and down motion; and the invention is more particularly concerned with an improved safety brake for a mast-type crane whereby the carriage of the crane is held against descent in the event of any failure of the rope, chain or other tension member that normally supports the carriage and controlledly raises and lowers it.

BACKGROUND OF THE INVENTION

Mast-type cranes for which the safety brake of this invention are particularly suitable are commonly used in warehouses and are often computer controlled. Such a crane may comprise an undercarriage that is mounted on flanged wheels to ride on a system of tracks extending throughout the warehouse or other operating site. Under the control of a human operator or a computer, the crane can move along the tracks to a selected aisle, thence along the aisle to a selected tier of shelves or drawers in front of which it stops. Projecting up from the undercarriage is a mast along which a carriage or platform moves up or down, to be brought to a predetermined level at which the carriage is opposite a selected one of the shelves or drawers in the tier at which the crane has stopped. Shuttle mechanism on the carriage withdraws the selected drawer from its storage position, and the crane then moves back along the tracks to an unloading station at which a needed item or items can be removed from the withdrawn drawer. The crane can then be sent back with the drawer to return it to its storage position.

The carriage is raised and lowered by means of a tension member—a chain or a wire rope—that is connected to the carriage and is ordinarily trained over a sheave at the top of the mast and thence down to a motor driven winch mounted on the undercarriage behind the mast. Failure of the tension member in a mast-type crane is not a common occurrence, but it is possible for the tension member to break, or for its connection with the carriage to break, and reasonable prudence should make provision for such failure. Accordingly, a well designed mast-type crane is equipped with a safety brake that engages automatically upon failure of the tension member, to hold the carriage against descent. Without a safety brake, the dropping of the carriage that would result from a tension member failure could result in injury to persons or damage to property in the vicinity of the crane, or in damage to the crane itself or to fragile and valuable cargo carried by the falling carriage.

A safety brake for a mast crane should of course operate reliably upon failure of the tension member but should not interfere with normal controlled descent of the carriage. An important consideration is that the safety brake mechanism be compact, so that the aisles along which the crane moves can be narrow for efficient utilization of floor space. The safety brake mechanism must also be vertically compact so that it does not limit the range of up and down motion of the carriage. Inasmuch as the safety brake is in the nature of emergency equipment which, under optimum conditions, is never used, it represents, in one sense, an unproductive investment and therefore low cost is a very important consideration.

A prior safety brake mechanism for a mast-type crane is disclosed by U.S. Pat. No. 3,250,399, to M. J. Dechantsreiter. In that mechanism, the tension member was connected to a generally horizontally extending arm that had one end pivoted to the carriage and had its opposite end normally engaged against a downwardly facing abutment on the carriage, the arm being held up against that abutment by the reaction of the tension member to the weight of the carriage. A normally open microswitch on the arm also engaged the abutment, to be held closed by such engagement and thereby provide for energization of a solenoid on the carriage. Upon failure of the tension member, the arm dropped out of engagement with the abutment, opening the microswitch and thus de-energizing the solenoid. With the solenoid de-energized, the weight of its plunger was eccentrically imposed upon a cam on the carriage to rotate the latter into wedge-like engagement with the mast.

The mechanism just described had the advantages of simplicity, compactness and reliability, but it had the significant disadvantage of requiring electrical supply connections for the switch and solenoid on the carriage that had to accommodate the up and down motion of the carriage. Furthermore, the rotatable cam that comprised the braking element engaged the rail with its periphery, making essentially only line contact with the rail and thus providing only a relatively small braking surface that was not well suited for supporting a heavy load. The brake was self-energizing, but because of the line contact between each cam and the mast, braking security was achieved by having the cam virtually bite into the mast, with the possibility of the guiding surfaces of the mast being scarred or dented if the safety brake was applied with a heavy load on the carriage.

A more recent safety brake that has been used on smaller mast-type cranes has comprised a pair of jaw members located at opposite sides of a braking rail on the mast. One of the jaw members had a braking surface that was parallel to its opposing surface of the rail, the other had a surface that was inclined relative to the rail, extending obliquely upwardly and towards its adjacent surface of the rail. A tapered braking member was confined between the inclined jaw member surface and the opposing rail surface, and upon failure of the tension member the tapered braking member was urged upwardly to wedge itself between the rail and the inclined jaw member. The actuating mechanism for this safety device was relatively complicated and expensive. It needed four different adjustments during assembly and rigging, and it required the provision of a separate rail on the mast that was engaged only by the safety brake elements. Another important objection was that the braking force applied to the rail was dependent upon the wedging action of the tapered member and could increase only if the tapered member slid along the inclined jaw member, whereas the tapered member was just as likely to slide along the rail and be held by friction against sliding relative to the jaw member.

SUMMARY OF THE INVENTION

The general object of the present invention is to provide a safety brake mechanism for mast-type cranes that is compact, simple, inexpensive and very reliable.

Another general object of the invention is to provide a safety brake mechanism having brake shoes which can cooperate with the same mast surfaces that are engaged by the guide members on the carriage and which present flat and substantially large surface areas to those mast surfaces to provide adequate support for the carriage and any load thereon without danger of denting or scratching the mast surfaces.

Another and more specific object of the invention is to provide a simple, compact and inexpensive safety brake mechanism of the character described that is self energizing, so that once the brake shoes of the safety brake have been brought into engagement with the mast, the weight of the carriage is applied to the brake shoes to urge them towards one another for clamping engagement with the mast, thus causing the application of a braking force which is substantially proportioned to the weight of the carriage and any load it may be carrying.

A further specific object of the invention is to provide a safety brake mechanism for mast-type cranes that is very quickly and easily adjusted and is actuated by simple spring means, and wherein tension is normally imposed upon the spring means by the weight of the carriage reacting upon the tension member and is immediately applied to brake shoe actuation as a result of failure of the tension member.

It is also a specific object of this invention to provide a safety brake mechanism which releases itself automatically when the crane is restored to operating condition, in response to a very slight raising of the carriage by means of the tension member.

These and other objects of the invention that will appear as the description proceeds are achieved in safety braking means of this invention for a crane wherein a carriage is confined to up and down motion along a rail by means of guide members on the carriage that engage opposite upright guiding surfaces on the rail, and wherein an elongated tension member is normally connected with the carriage to support it and control its position along the rail. The safety braking means comprises a load transmitting element normally connected with the tension member and cooperating abutment means on the load transmitting element and on the carriage, normally engaged to impose the weight of the carriage upon the tension member and to define a normal position of the load transmitting element in which it is confined to motion with the carriage but from which the load transmitting element is movable in one direction relative to the carriage. Spring means react between the carriage and the load transmitting element to exert upon the latter a biasing force that moves it in said one direction when the carriage loses the support of the tension member. The safety brake further comprises a pair of brake shoes, one for each of said pair of opposite guiding surfaces on the rail, each having a braking surface opposingly engageable with its said surface on the rail, and a brake shoe carrier extending across the rail transversely to said pair of guiding surfaces and to which said brake shoes have horizontally spaced apart connections that dispose them adjacent to their respective guiding surfaces, said brake shoe carrier having a connection with the carriage which is spaced in one horizontal direction from the rail and about which a portion of the brake shoe carrier that is spaced in the other horizontal direction from the rail can be swung upwardly to clampwise engage the brake shoes against the rail. Finally, the safety brake further comprises motion transmitting means providing a connection between the load transmitting element and said portion of the brake shoe carrier whereby movement of the load transmitting element in said one direction imparts upward swinging movement to said portion of the brake shoe carrier.

Preferably the braking surface of each brake shoe is substantially flat, and the connection of each brake shoe to the brake shoe carrier substantially confines the brake shoe to swiveling relative to the brake shoe carrier about a horizontal axis parallel to said braking surface. It is also preferred to have the connection between the brake shoe carrier and the carriage comprise a link having a lower connection to the carriage that is spaced a distance in said one direction from the rail and having an upper connection to the brake shoe carrier that is spaced above said lower connection and is at a greater distance in said direction from the rail, so that upon frictional engagement of the brake shoes with the rail the weight of the carriage forces the brake shoes clampwise towards the rail.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
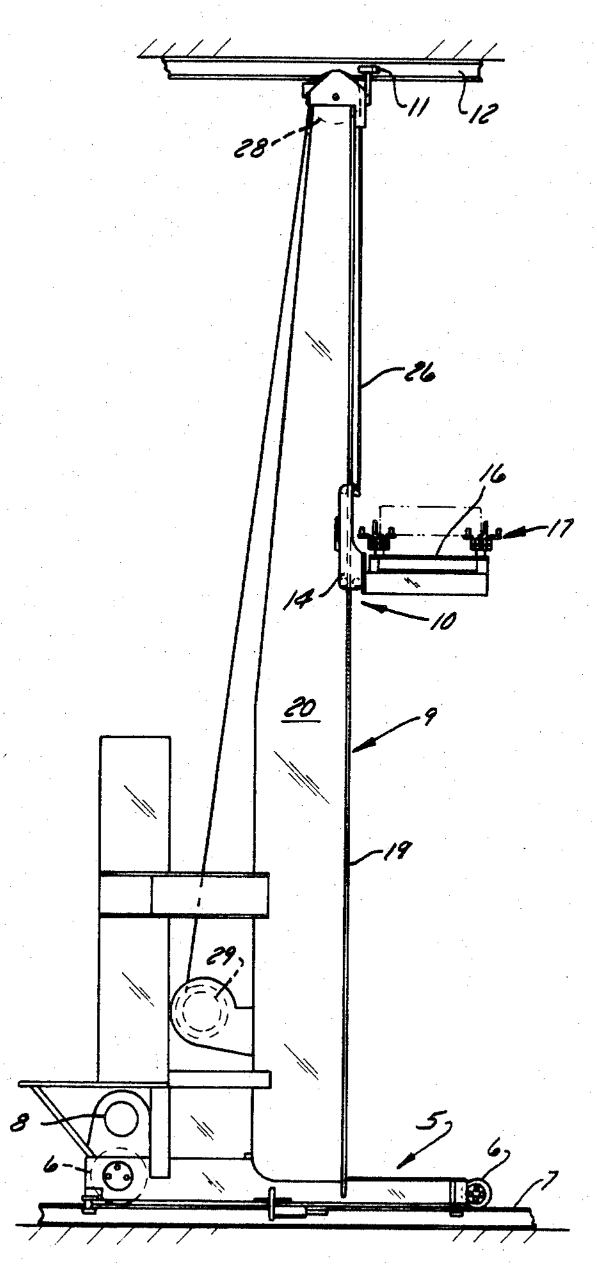
FIG. 1 is a view in side elevation of a mast-type crane in which there is incorporated a safety brake of this invention.
Figure 2:
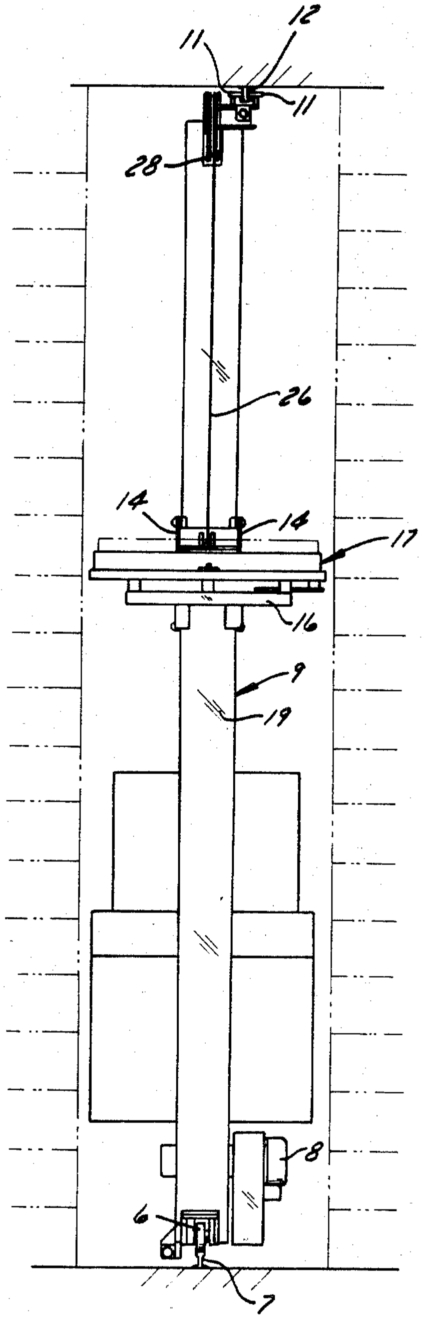
FIG. 2 is a view in front elevation of the crane shown in FIG. 1.
Figure 4:
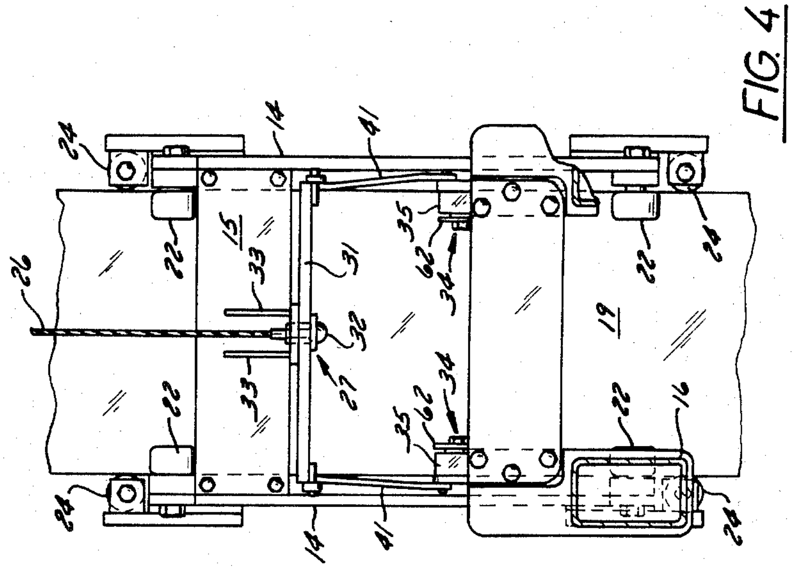
FIG. 4 is a view in vertical section, taken substantially on the plane of the line 4—4 in FIG. 3.
Figure 3:
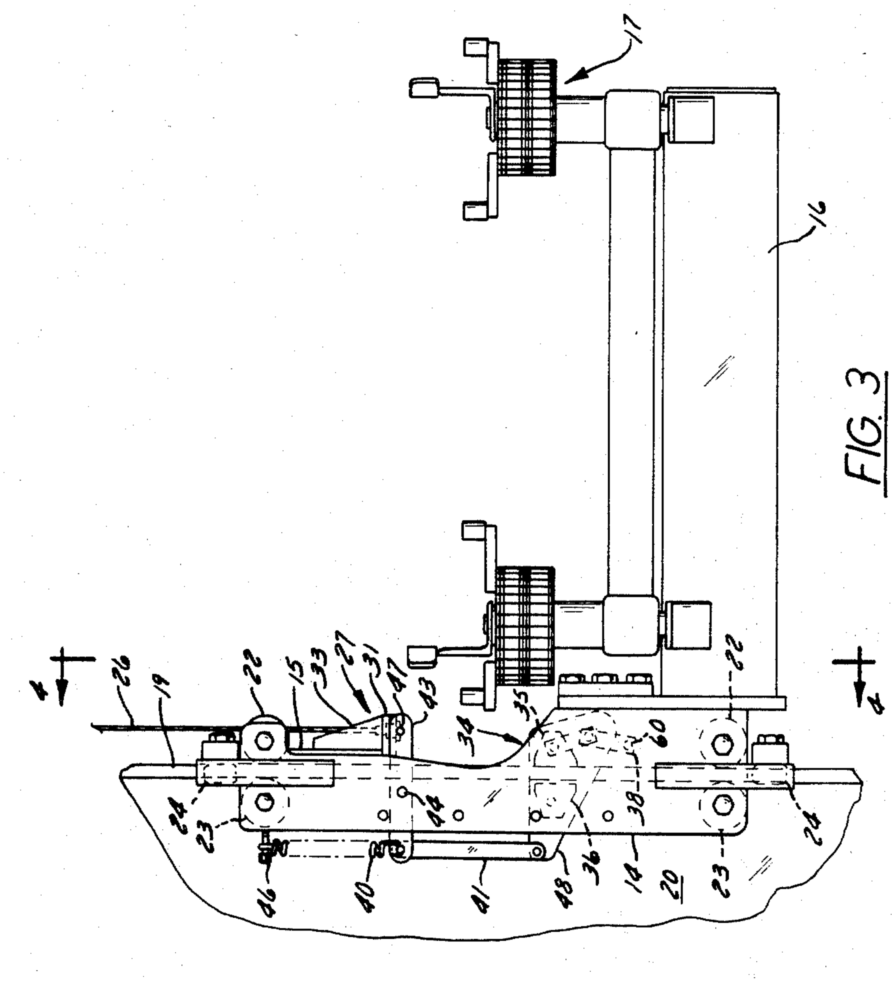
FIG. 3 is a fragmentary view in side elevation, on an enlarged scale, showing the relationship of the safety brake mechanism to the carriage of the crane shown in FIGS. 1 and 2 and the connections of the carriage to the mast and the tension member.
Figure 6:
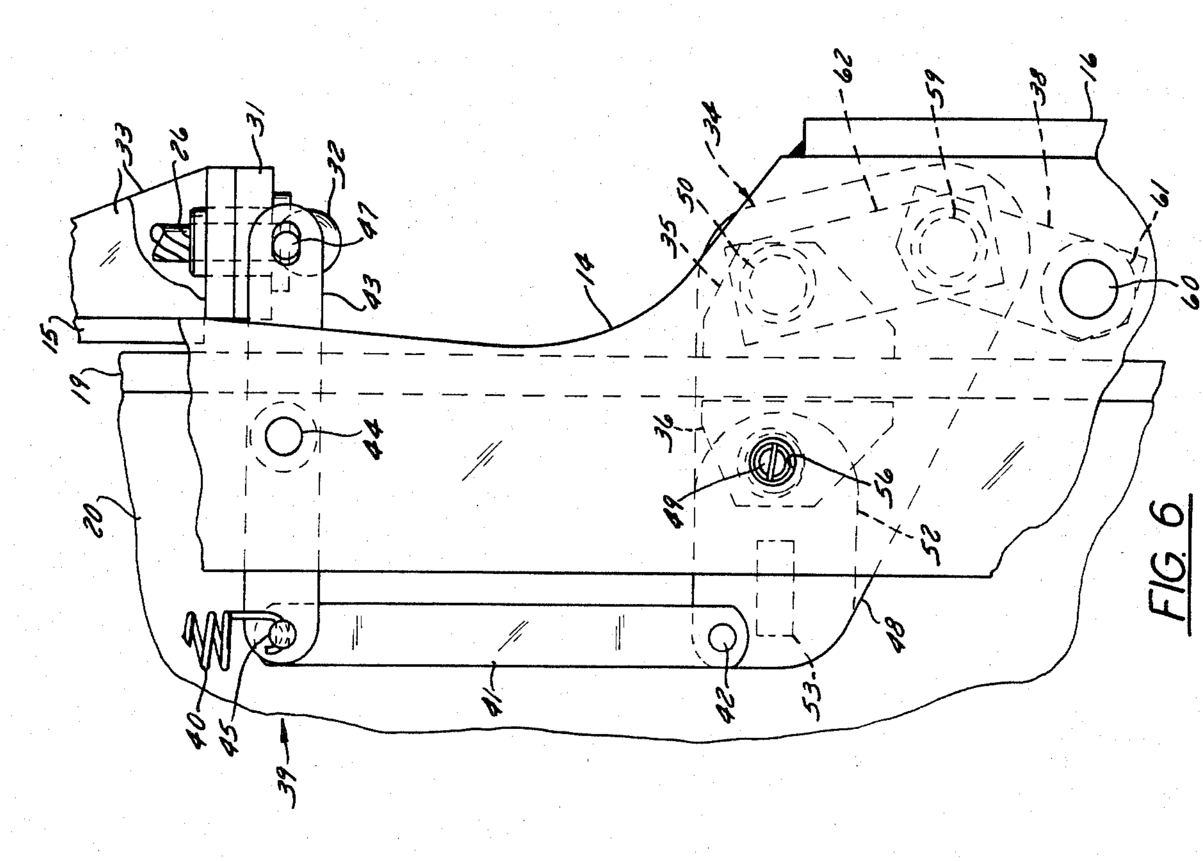
FIG. 6 is a fragmentary view in side elevation, on a further enlarged scale, of the portion of the carriage assembly comprising the safety brake mechanism, which is shown in its normal released position.
Figure 5:
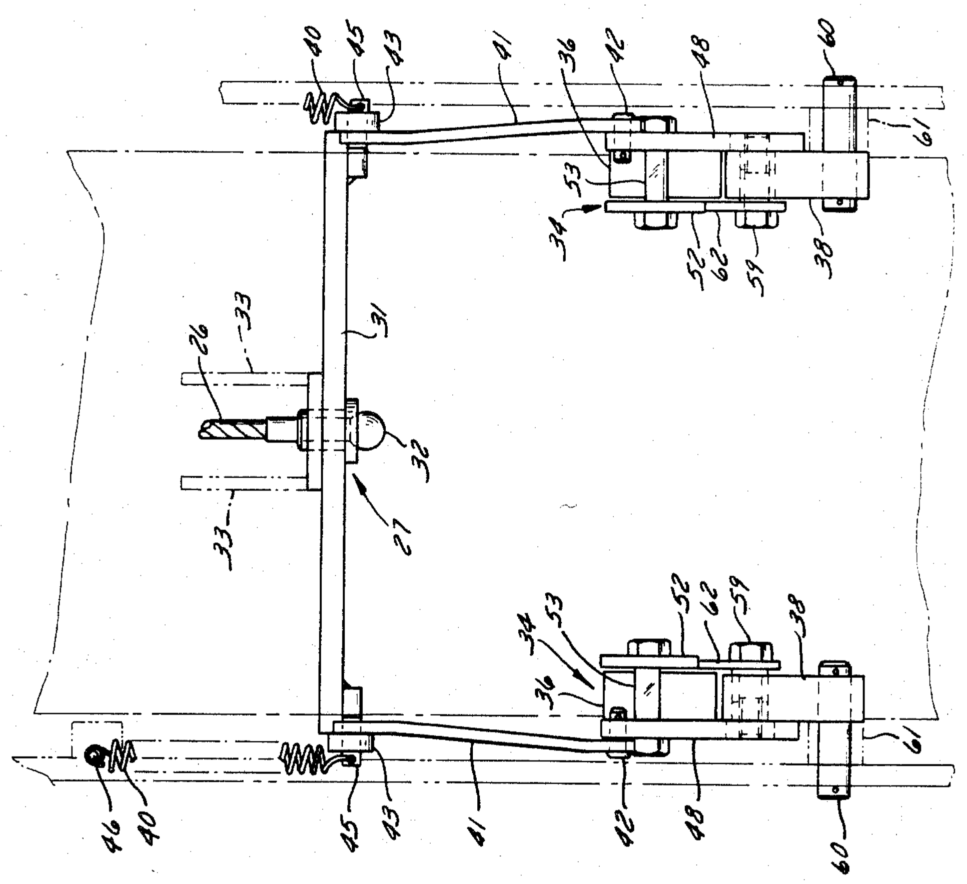
FIG. 5 is a view of the carriage and the safety brake mechanism in rear elevation, the mast being indicated in phantom.

A mast crane of the type to which this invention relates comprises a frame or undercarriage 5 that is mounted on flanged wheels 6 to run on a rail 7 on the floor of a warehouse or other site of operation of the crane. For propulsion of the crane along the rail 7, at least one of the wheels 6 is driven by a motor 8 that is mounted on the undercarriage 5. Projecting up from the undercarriage 5 is an upright mast 9 by which a carriage 10 is guided for up and down movement. To stabilize the crane, rollers 11 at the top of the mast 9 engage an overhead rail 12.

The carriage 10 comprises a pair of vertically elongated side plates 14, one at each side of the mast 9, which are connected by a transverse beam 15 from which a platform 16 is forwardly cantilevered. When the crane is stopped before a tier of drawers, and the platform 16 is at the level of a selected one of the drawers, known shuttle mechanism 17 on the platform can draw the selected drawer onto the platform for transport to a delivery station or can move a drawer off of the platform and back into its cubicle.

The mast 9 comprises a vertically elongated plate-like rail 19 that has flat forwardly and rearwardly facing surfaces. Reenforcing structure 20 is secured to the rear surface of the flat rail 19 to stiffen it and hold it upright. The reenforcing structure 20 is spaced inwardly from the side edge portions of the rail 19, which provide its guiding surfaces.

Each of the vertically elongated side plates 14 of the carriage extends flatwise across one of the side edges of the rail 19. For guidance of the carriage along the mast, the side edge portions of the rail 19 are engaged by sets of guide members at the top and at the bottom, respectively, of each of the vertically elongated side plates 14 of the carriage. Each set of guide members comprises a front roller 22 that engages the front surface of the rail 19, an opposing rear roller 23 that engages the rear surface of the rail, and an edge roller 24 that rides along the edge surface of the rail.

The carriage 10 is drawn up along the mast, controlledly lowered, and normally supported at any stopped position along the mast by means of a tension member 26 which is in this case illustrated as a wire rope but which could of course be a chain or some other type of cable or tension band. At one of its ends the tension member 26 has a connection 27 with the carriage, as described hereinafter. From that connection 27 the tension member 26 extends up along the front side of the mast to an idler sheave 28 at the top of the mast, thence down behind the mast to a motor-driven winch 29 that is supported in a fixed position on the undercarriage 5, near the bottom of the mast.

The connection 27 between the tension member 26 and the carriage 10 comprises a horizontally extending cross-bar 31, to the middle of which the tension member is anchored and which serves as a load transmitting element through which the weight of the carriage is imposed upon the tension member. As shown, the tension member 26 extends through a transverse hole in the cross-bar 31 and has a ball fitting 32 secured to its end beneath the cross-bar, which fitting bears upwardly against the cross-bar to connect it with the tension member. In turn, the cross-bar 31 normally bears upwardly against the bottom surfaces of forwardly projecting abutment plates 33 on the carriage, one at each side of the tension member, each secured to the beam 15 that bridges the carriage side plates 14. Thus the abutment plates 33 define a normal position of the cross-bar 31, which it occupies as long as the tension member 26 is capable of supporting the carriage and in which the cross-bar is constrained to move with the carriage; but the cross-bar drops down from that normal position in the event of breakage of the tension member, and by its downward movement it effects engagement of the safety brake of this invention, as will appear from the following description.

The safety brake comprises two brake shoe carriers 34, each of which carries a front brake shoe 35 and a rear brake shoe 36. The brake shoe carriers 34 are located at opposite sides of the carriage, each being inwardly adjacent to one of the side plates 14 of the carriage and extending across the adjacent edge of the rail 19 of the mast. Each brake shoe carrier 34 disposes its front brake shoe 35 in opposing relation to the front surface of the rail 19 and its rear brake shoe 36 in opposing relation to the rear surface of that rail.

At its front end each brake shoe carrier 34 has a link connection 38 with its adjacent carriage side plate 14. At its rear end each brake shoe carrier has a connection 39 with the load transmitting cross-bar 31, comprising motion transmitting means whereby dropping of the cross-bar upon failure of the tension member 26 causes the brake shoes 35, 36 to be moved into clamping engage against the rail 19, such motion and engagement being assisted and augmented by spring means 4.

The connection 39 between each brake shoe carrier 34 and the cross-bar 31 comprises an upright strut link 41 for each brake shoe carrier and, for each strut link, a medially fulcrummed lever 43 that normally extends substantially horizontally. Each strut link 41 has at its lower end a pivotal connection 42 to the rear end of its brake shoe carrier 34 and has at its upper end a pivotal connection 45 to a rear arm of its lever 43. Each of the levers 43 overlies the inner surface of a carriage side plate 14, and its fulcrum is defined by a pivotal connection 44 to the side plate. The front arms of the levers 43 are connected with opposite pin-like end portions 47 of the cross-bar 31, which extend through lengthwise elongated slots in the levers.

The spring means 40 for effecting brake application upon failure of the tension member 26 preferably comprises a pair of coiled tension springs, each connected at a lower end to the connection 45 between a strut link 41 and its lever 43 and connected at its upper end to a pin-like spring seat 46 that is fixed to the adjacent carriage side plate 14. Each of the springs 40 is thus substantially in vertical alignment with one of the strut links 41 and is normally under a tension that tends to bias its strut link upwardly and thereby swing the brake shoe carrier 34 about its link connection 38 with the carriage. Normally, however, the tension force exerted by the springs 40 is overcome by the weight of the carriage, acting through the levers 43 and their respective fulcrum connections 44 to maintain the cross-bar 31 engaged with the abutment plates 33, so that unless and until there is a failure of the tension member 26, the springs 40 remain under tension and the brake shoe carriers 34 remain in normal positions in which their brake shoes 35, 36 are out of engagement with the rail 19.

Each brake shoe carrier 34 comprises a more or less triangular plate 48 that has its surfaces flatwise parallel to those of its outwardly adjacent carriage side plate 14. Each of the brake shoes 35, 36 comprises a block of friction material having a flat rectangular friction surface that engages the rail 19 for braking and having a bore therethrough which has its axis parallel to that friction surface. It will be observed that the brake shoes 35 and 36 can be identical with one another. An eccentric pin 49 (more fully described hereinafter) extends horizontally through the bore in the rear brake shoe 36 to swivelably secure it to the brake shoe carrier, and a pivot member 50 in the bore in the front brake shoe 35 provides a swivel connection between it and the carrier.

Figure 7:
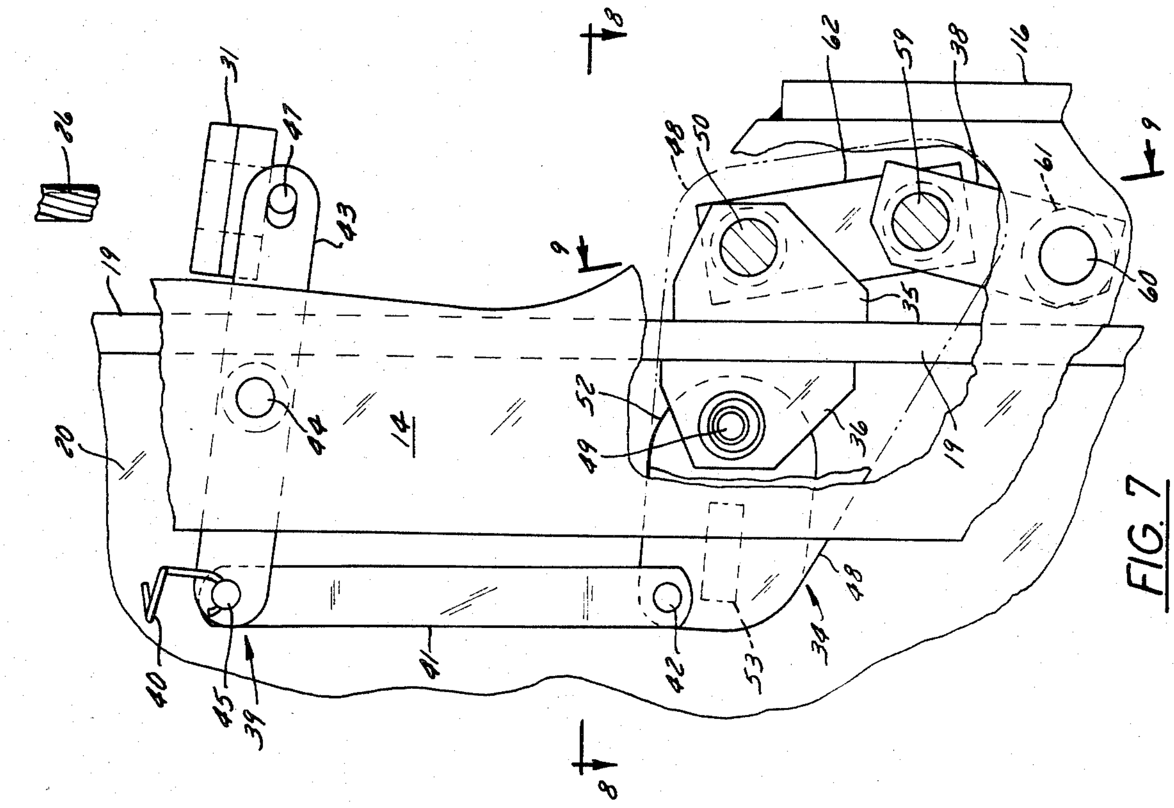
FIG. 7 is a view generally similar to FIG. 6 but showing the safety brake engaged.
Figure 8:
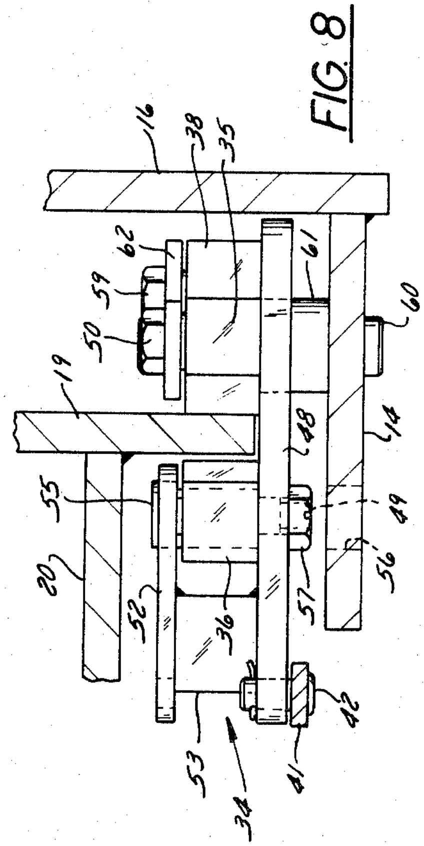
FIG. 8 is a sectional view taken on the plane of the line 8—8 in FIG. 7.
Figure 9:
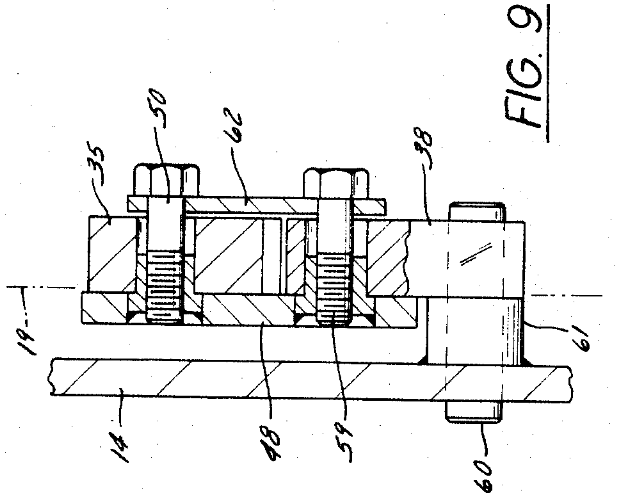
FIG. 9 is a sectional view taken on the plane of the line 9—9 in FIG. 7.

An inner plate 52 is fixed in inwardly spaced parallel relation to the rear portion of the triangular plate 48 by means of a spacer block 53. The rear brake shoe 36, as best seen from FIGS. 7 and 8, is confined between the plates 48 and 52. The eccentric inner end portion 55 of the pin 49 is rotatably received in a closely fitting hole in the inner plate 52, and its threaded outer end portion projects through an oversize hole in the larger carrier plate 48. For adjusting rotation of the eccentric pin 49, whereby the rear brake shoe 36 is carried towards and from the rail 19, the pin 49 has a screwdriver cross slot in its outer end that is accessible through a hole 56 in the carriage side plate 14. The eccentric pin 49 is locked in any desired position of its adjusting rotation by means of a nut 57 on its threaded outer end.

The connection between each brake shoe carrier 34 and its adjacent carriage side plate comprises a bar-like anchor link 38 that has at its upper end a pivotal connection 59 to the brake shoe carrier and at its lower end a pivotal connection 60 to the carriage side plate 14. The lower connection 60 can comprise a pin that extends through the side plate 14, through a spacer sleeve 61 bonded to the inner surface of the side plate, and through the link 38. The upper pivotal connection 59 can comprise another pin that extends through the larger plate 48 of the carrier, through the anchor link 38, and through the lower end of a flat side link 62. The upper end of the side link 62 is connected to the pin or bolt that provides the swivel connection 50 between the front brake shoe 35 and the brake shoe carrier. Since the anchor link 38 has substantially the same thickness as the brake shoes, the side link 62 overlies the inner faces of the front brake shoe 35 and the anchor link 38 and it confines them to their respective swiveling motions.

Attention is directed to the fact that the pivot connection 59 between the brake shoe carrier 34 and the anchor link 38 is not only above the connection of the anchor link with the carriage side plate 14 but is also horizontally more distant from the rail 19 than that lower connection. The resultant upward and forward inclination of the anchor link 38 accounts for self-energizing operation of the brake mechanism of this invention.

As can be seen from FIG. 7, any failure of the tension member 26 allows the cross-bar 31 to drop away from its normal position. Downward swinging of the front end of each lever 43 under the weight of the cross-bar 31 is augmented by the springs 40, which lift the rear end of that lever and with it the strut link 41. The rear end of each brake shoe carrier 34 is thereby swung up about its anchor link 38, foreshortening the horizontal distance between the brake shoes 35, 36 and bringing them into engagement with the rail 19. As soon as the brake shoes derive any frictional retardation from their engagement with the rail 19, the weight of the carriage 10, acting through the anchor link 38, imposes upon the brake shoe carrier 34 a force that tends to rotate it about the brake shoes 35, 36, with the result that the brake shoes are more tightly clamped to the rail and the clamping force under which the brake shoes engage the rail is proportional to the weight of the carriage.

After a crane incorporating the safety brake mechansim of this invention is assembled, the only adjustment that must be made to the mechanism is that which establishes the brake shoes 35, 36 in the properly spaced relation to one another to maintain them disengaged from the rail 19 under normal operating conditions, and such adjustment is accomplished very quickly and easily. A shim plate (not shown) of suitable thickness (typically 1/32 in.) is interposed between the rear brake shoe 36 and the rail 19, and the eccentric pin 49 is rotated to bring that brake shoe into firm engagement with the shim plate. The nut 57 is then tightened to confine the eccentric pin 49 against rotation and the shim plate is removed.

It will be obvious that after a tension member failure that has caused the safety brake mechanism to operate, no special attention need be given to that mechanism. When the crane is returned to operating condition, tension on the tension member that is sufficient to raise the carriage slightly will release the safety brake and allow it to return to its normal condition.

From the foregoing description taken with the accompanying drawings it will be apparent that this invention provides a simple, compact, inexpensive and very reliable safety brake mechanism for a mast-type crane whereby descent of the carriage is prevented in the event of failure of the tension member that normally establishes the position of the carriage along the mast. It will also be apparent that the safety brake mechanism of this invention is quickly and easily adjusted, provides a braking force which is inherently proportioned to the weight of the carriage, cooperates with the same surfaces of the mast that effect guidance of the carriage without risk of damaging those mast surfaces, and is self-releasing when the tension member is restored to operating condition.

What is claimed as the invention is:

1. In apparatus comprising a mast (9); guide rail means (19) including a pair of upright guiding surfaces extending along said mast and facing in forward and rear directions; a carriage (10) guided by said guide rail means (19) for up and down movement on said mast (9); an elongated tension member (26) normally connected with said carriage (10) to support it and control its position along said mast (9); and safety braking means for stopping and holding said carriage (10) against descent in the event said carriage (10) loses the support of said tension member (26), said safety braking means comprising:

A. a load transmitting element (31) normally connected with said tension member (26);

B. abutment means (33) on said carriage (10) having an abutment surface normally engaged by said load transmitting element (31) and by which the weight of said carriage (10) is imposed upon said tension member (26) through said load transmitting element (31);

C. a pair of brake shoes (35, 36), one for each of said guiding surfaces of said guide rail means (19), each brake shoe (35, 36) having a friction face engageable with its guiding surface;

D. a brake shoe carrier member (48) extending transversely to said guide rail means (19) and projecting beyond said guiding surfaces thereof in horizontal directions;

E. a first link (38) pivotally connected at its other end to said brake shoe carrier member (48) to enable said brake shoe carrier member (48) to swing relative to said carriage (10);

F. connecting means pivotally connecting said brake shoes (35, 36) to said brake shoe carrier member (48) with said friction face of each brake shoe (35, 36) substantially opposing its guiding surface so that said brake shoes (35, 36) can clampwise engage said guiding surfaces with their said friction faces upon upward swinging of said brake shoe carrier member (48), said connecting means comprising a second link (62) pivotally connected at one end to said brake shoe carrier member (48) and pivotally connected at its other end to the brake shoe (35) which engages the guiding surface facing in the forward direction;

G. motion transmitting means connected between said load transmitting element (31) and said brake shoe carrier member (48) to swing said brake shoe carrier member (48) upon motion of said load transmitting element (31) away from its engagement with said abutment surface of said abutment means (33), said motion transmitting means comprising a third link (43) pivotally mounted intermediate its ends on said carriage (10), one end of said third link (43) being connected to said load transmitting element (31), and a fourth link (41) pivotally connected at one end to said brake shoe carrier member (48) and pivotally connected at its other end to the other end of said third link (43); and H. spring means (40) connected between said carriage (10) and said third link (43) for urging said brake shoe carrier member (48) upward with a force which is normally overcome by the weight of said carriage (10) maintaining said load transmitting element (31) engaged with said abutment surface.

* * * * *